United States Patent
Yeh et al.

(10) Patent No.: US 12,494,158 B2
(45) Date of Patent: Dec. 9, 2025

(54) LIGHT-EMITTING-DIODE DRIVER STRUCTURE APPLICABLE TO DRIVING A DISPLAY PANEL AND OPERATION METHOD THEREOF

(71) Applicant: NOVATEK MICROELECTRONICS CORP., Hsinchu (TW)

(72) Inventors: Che-Wei Yeh, Hsinchu (TW); Yu-Hsiang Wang, Hsinchu (TW); Ho-Chun Chang, Hsinchu (TW); Po-Hsiang Fang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/467,050

(22) Filed: Sep. 14, 2023

(65) Prior Publication Data
US 2024/0428722 A1 Dec. 26, 2024

Related U.S. Application Data

(60) Provisional application No. 63/509,128, filed on Jun. 20, 2023.

(51) Int. Cl.
*G09G 3/20* (2006.01)
*G09G 3/32* (2016.01)
*G09G 3/3233* (2016.01)
*G09G 3/34* (2006.01)
*G09G 3/36* (2006.01)

(52) U.S. Cl.
CPC ............ *G09G 3/32* (2013.01); *G09G 3/2085* (2013.01); *G09G 3/2092* (2013.01);
(Continued)

(58) Field of Classification Search
CPC ........... G09G 3/32; G09G 2370/10; G09G 2310/027; G09G 5/006; G09G 2310/08;
(Continued)

(56) References Cited

U.S. PATENT DOCUMENTS

| | | | |
|---|---|---|---|
| 8,450,949 B2 * | 5/2013 | Jheng | H05B 45/10 |
| | | | 315/297 |
| 11,132,939 B2 * | 9/2021 | Yen | G09G 3/32 |

(Continued)

FOREIGN PATENT DOCUMENTS

| | | |
|---|---|---|
| CN | 101826297 A | 9/2010 |
| CN | 112399662 A | 2/2021 |

(Continued)

OTHER PUBLICATIONS

Official Action mailed to Taiwanese Counterpart Patent Application No. 112142761 dated Oct. 16, 2024.

*Primary Examiner* — Dismery Mercedes
(74) *Attorney, Agent, or Firm* — Rosenberg, Klein & Lee

(57) ABSTRACT

A light-emitting-diode driver structure applicable to driving a display panel and operation method thereof are provided. The LED driver structure includes at least one LED driving group, and the LED driving group is composed of a plurality of LED driving circuits which are serially connected in cascade. Each LED driving circuit of the LED driving group receives a data input signal in common. Upon receiving control signals, output signals are generated to drive the display panel. The multi-point driving circuit scheme can be fully or partially applied in the driver structure as required. In addition, a plurality of enable signals can be further adopted to activate each LED driving circuit, for avoiding the FIFO register used in the prior arts. By employing the disclosed technical contents, the present invention is effective in reducing both redundant power waste and circuit layout area of a conventional LED driver.

16 Claims, 8 Drawing Sheets

(52) U.S. Cl.
CPC ......... *G09G 3/3233* (2013.01); *G09G 3/3406* (2013.01); *G09G 3/342* (2013.01); *G09G 3/3685* (2013.01); *G09G 2300/0426* (2013.01); *G09G 2310/08* (2013.01); *G09G 2330/021* (2013.01)

(58) Field of Classification Search
CPC ......... G09G 2370/08; G09G 2330/021; G09G 2310/0286; G09G 2310/0275; G09G 2310/0264; G09G 2352/00; G09G 2320/04; G09G 2300/0426; G09G 3/3406; G09G 3/342; G09G 2320/0626; G09G 2370/14; G09G 2370/00; G09G 3/2096; G09G 3/3685; G09G 3/2092; G09G 3/3225; G09G 3/2085; G09G 3/006; G09G 3/3233; G09G 3/3283; G09G 2310/0218; G09G 2310/0278; G09G 3/3275; H05B 45/46; H05B 45/00; H05B 45/30; H05B 45/40; H01L 25/167
See application file for complete search history.

(56) References Cited

U.S. PATENT DOCUMENTS

| | | | | |
|---|---|---|---|---|
| 11,974,371 | B2* | 4/2024 | Wang | H05B 45/33 |
| 12,057,080 | B2* | 8/2024 | Wong | G09G 3/3216 |
| 12,232,230 | B2* | 2/2025 | Kim | H05B 45/325 |
| 2005/0062685 | A1* | 3/2005 | Nogawa | G09G 3/2085 345/547 |
| 2006/0017664 | A1* | 1/2006 | Takagi | G09G 3/3283 345/76 |
| 2009/0230885 | A1 | 9/2009 | Tanaka | |
| 2011/0043545 | A1* | 2/2011 | Huang | G09G 3/2088 345/82 |
| 2011/0285325 | A1* | 11/2011 | Jheng | H05B 45/10 315/312 |
| 2015/0302796 | A1* | 10/2015 | Lu | G09G 3/3225 345/83 |
| 2019/0295457 | A1* | 9/2019 | Li | G09G 3/32 |
| 2021/0049956 | A1* | 2/2021 | Yeh | G09G 5/008 |
| 2021/0366391 | A1* | 11/2021 | Wei | G01J 1/44 |
| 2021/0407376 | A1 | 12/2021 | Yue et al. | |
| 2022/0020310 | A1* | 1/2022 | Gray | G09G 3/32 |
| 2023/0217564 | A1* | 7/2023 | Kim | G02F 1/133603 315/291 |
| 2023/0282156 | A1* | 9/2023 | Wong | G09G 3/32 345/690 |
| 2024/0112650 | A1* | 4/2024 | Park | G09G 5/008 |
| 2024/0412683 | A1* | 12/2024 | Chen | G09G 3/32 |

FOREIGN PATENT DOCUMENTS

| | | |
|---|---|---|
| TW | 201042601 A | 12/2010 |
| TW | 202244877 A | 11/2022 |

\* cited by examiner

LIGHT-EMITTING-DIODE DRIVER STRUCTURE APPLICABLE TO DRIVING A DISPLAY PANEL AND OPERATION METHOD THEREOF

This application claims priority for the U.S. provisional patent application No. 63/509,128 filed on 20 Jun. 2023, the content of which is incorporated by reference in its entirely.

BACKGROUND OF THE INVENTION

Field of the Invention

The present invention is related to a light-emitting-diode (LED) driver structure and an operation method thereof. More particularly, the present invention is aimed to provide a display panel and an operation method of the light-emitting-diode (LED) driving circuit of the display panel thereof, in which the LED driving circuit is a multi-point (also known as a multi-drop) LED driver. And the present invention also provides a differential clock embedded interface for the multi-point LED driver. As a result, it is believed that not only power consumption and circuit layout area of the LED driver can be reduced, but also an enhanced data transmission efficiency of the LED driving circuit when employing the differential clock embedded interface for the multi-point LED driver can be accomplished.

Description of the Prior Art

As known, a light-emitting-diode (LED) display is a flat panel display that uses an array of light-emitting diodes as pixels for a video display. In recent years, since the LED displays are capable of providing the general illumination in addition to visual display, the vivid variety of brightness allows them to be used outdoors where they are visible in the sun for store signs and billboards, or to be used for stage lighting or other decorative (as opposed to informational) purposes. As the LED displays are able to offer higher contrast ratios than a projector and are thus becoming an adequate alternative to traditional projection screens, the LED displays have also become commonly used in destination signs on public transport vehicles, as well as variable-message signs on highways and may also be used for large and uninterrupted (without a visible grid arising from the bezels of individual displays) video walls.

When regarding a detailed configuration of the LED display panel devices, it is known that the LED display panel device mostly includes a plurality of source driver integrated circuits (ICs) for supplying a data voltage to data lines of the LED display panel device, a plurality of gate driver ICs for sequentially supplying a gate pulse (or a scan pulse) to gate lines of the LED display panel device, and a timing controller for controlling the above-mentioned source driver ICs and the gate driver ICs, etc. In general, the timing controller supplies digital video data, clock signals for sampling of the digital video data, a control signal for controlling operations of the source driver ICs, etc. to the source driver ICs through an interface, for example, a mini low voltage differential signaling (LVDS) interface. And the source driver ICs convert the digital video data received from the timing controller into an analog data voltage and supplies the analog data voltage to the data lines. In addition, a plurality of red (R) data transmission lines, green (G) data transmission lines, blue (B) data transmission lines, control lines for controlling operation timings of an output and a polarity conversion operation of the source driver ICs, clock transmission lines, and so on, are also required between the timing controller and the source driver ICs. In the mini LVDS interface, the RGB data, for example, RGB digital video data and its clock signal will be transmitted as differential signal pair. Therefore, for the transmission of the RGB data signal, it is apparent that an enormously large number of lines will be simultaneously required to be disposed between the timing controller and the source driver ICs. Hence, such configuration makes it extremely difficult to reduce a width of the source printed circuit board (PCB).

In addition, in a structure of a conventional LED display panel device module, the source driver ICs or the gate driver ICs are usually electrically connected in series by utilizing data input pulse signals and data output pulse signals. It is to be noticeable that each of the driver ICs receives its data input pulse signal and/or triggering clock signal sent from a driver IC of the previous stage and becomes activated. Afterwards, the driver IC is able to be operable to transmit its data output pulse signal to a driver IC of the next stage. Under such an architecture scheme, not only an additional driver pin will be needed when data transmission or configuration is desired between the drivers, but also an additional transceiver circuit layout area will be required, which whereby leads to increased costs of the prior designs.

Therefore, in order to solve the above-mentioned problems, several modified schemes have been discussed these days in the current technology and yet, challenges are still remained, which makes continual improvements remains desirable. And as a result, it, in view of all, should be apparent and obvious that there is indeed an urgent need for the professionals in the field for a novel and inventive light-emitting-diode (LED) driving circuit as well as its operation method thereof, to be developed, so as to solve the above-mentioned issues, and to achieve in an optimized result of the LED display panel device.

SUMMARY OF THE INVENTION

In order to overcome the above-mentioned disadvantages, one major objective in accordance with the present invention is to provide a novel LED driver structure, which is applicable to driving a display panel. According to the present invention, the disclosed LED driver structure is designed in a multidrop manner such that the disclosed LED driver structure is a multi-point LED driver.

According to the embodiment of the present invention, a light-emitting-diode (LED) driver structure applicable to driving a display panel is provided. The light-emitting-diode driver structure is electrically coupled with a plurality of scan lines, receives a first data input signal and accordingly generates a plurality of output signals for driving the display panel, and the light-emitting-diode driver structure comprises a first light-emitting-diode (LED) driving group.

The first LED driving group includes a plurality of M light-emitting-diode (LED) driving circuits which are connected in series and M is a positive integer. Each of the plurality of M light-emitting-diode driving circuits receives the first data input signal in common, such that the first LED driving group is in a multidrop manner. As a result, upon receiving the first data input signal in common, each of the plurality of M light-emitting-diode driving circuits being electrically coupled with the plurality of scan lines accordingly generates the plurality of output signals so as to drive the display panel.

In addition, according to a further embodiment of the present invention, the disclosed light-emitting-diode driver structure may alternatively further include a second LED driving group, and the second LED driving group is electrically connected in series with the above-mentioned first LED driving group. The second LED driving group includes a plurality of N light-emitting-diode (LED) driving circuits which are connected in series and N is a positive integer. According to the embodiment, each of the plurality of N light-emitting-diode driving circuits receives a second data input signal in common, such that the second LED driving group is in a multidrop manner. As a result, upon receiving the second data input signal in common, each of the plurality of N light-emitting-diode driving circuits being electrically coupled with the plurality of scan lines accordingly generates the plurality of output signals so as to drive the display panel.

In one embodiment of the invention, the second data input signal of the second LED driving group can be an independent data input signal. Alternatively, in another feasible and variant embodiment of the invention, then the second data input signal of the second LED driving group may also be generated and provided by a signal data output terminal of the foregoing first LED driving group. In other words, according to such an embodiment, the second LED driving group, which includes the plurality of N LED driving circuits is preferably, configured to receive a data output signal of a last stage of the plurality of M LED driving circuits of the first LED driving group in common.

Moreover, since the disclosed light-emitting-diode (LED) driver structure of the present invention may comprise a plurality of LED driving group as well as driving circuits which are disposed therein cascade, for the objective to accurately determine and distinguish which driving circuit needs to be activated, an enable signal is also to be provided by the present invention.

For instance, according to one applicable embodiment of the present invention, then each of the light-emitting-diode driving circuits may further be disposed to additionally include a data enable input terminal and a data enable output terminal, and the data enable input terminal is adapted to receive the above-disclosed enable signal.

By such configuration, when the enable signal turns to be logically high-level, it drives the corresponding light-emitting-diode driving circuit such that the light-emitting-diode driving circuit is activated to receive a data packet from its data input signal. As a result, as the enable signal of each light-emitting-diode driving circuits is successively turned to be logically high-level, each light-emitting-diode driving circuits will be sequentially activated in order. As a result, the data packet of the data input signal can be successively transmitted in the light-emitting-diode driver structure, including the first LED driving group as well as in the second LED driving group.

On the other hand, the present invention in another aspect is also provided to disclose an operation method which is applicable to the light-emitting-diode driver structure for driving a display panel.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
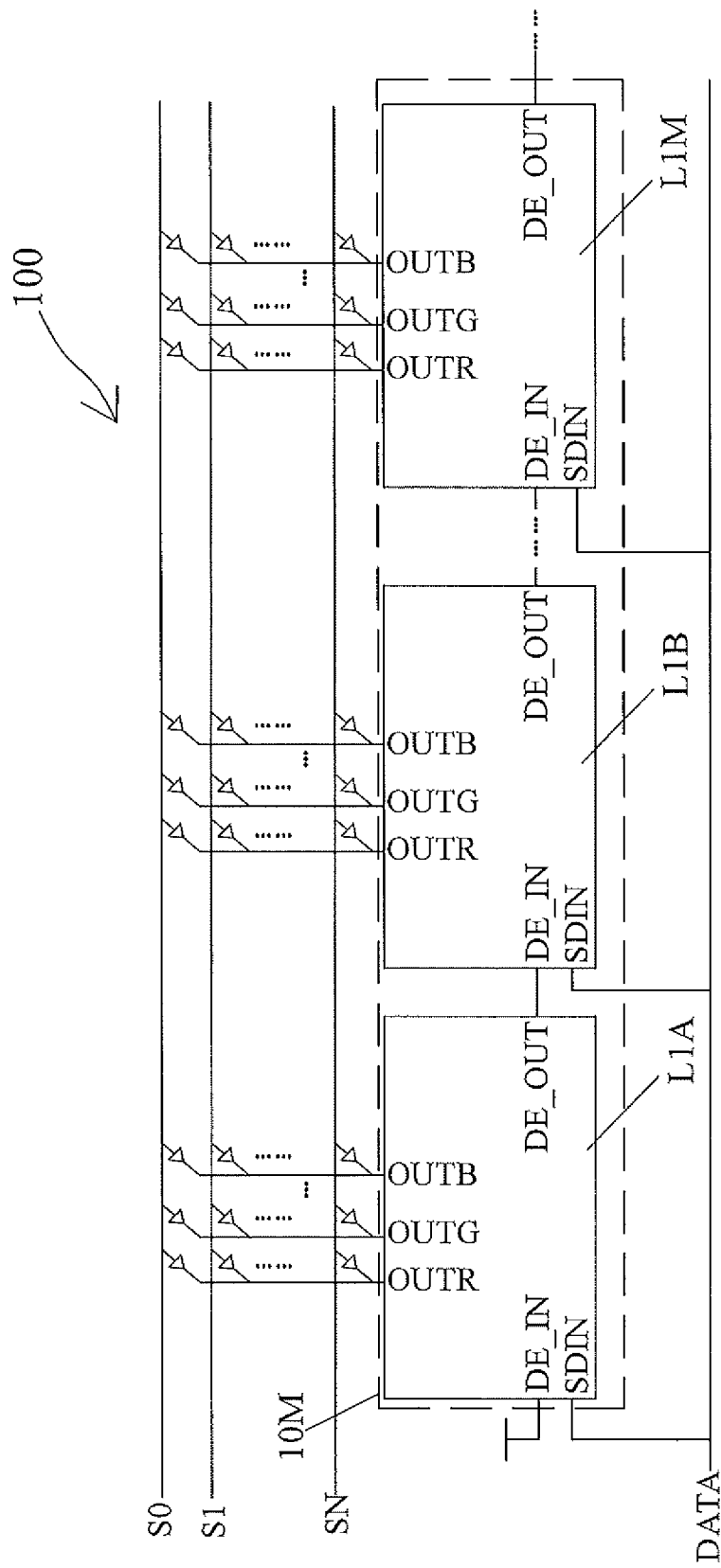
FIG. 1 schematically shows a system diagram illustrating a light-emitting-diode driver structure applicable to driving a display panel in accordance with a first embodiment of the present invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express that the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/ without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

In the following descriptions, a light-emitting-diode (LED) driver structure which is applicable to driving a display panel will be provided. In addition, the present invention also provides an operation method of the disclosed light-emitting-diode driver structure thereof. According to the provided application, the proposed light-emitting-diode driver structure and its operation method thereof are able to be adopted in order to achieve in optimization for both power consumption and circuit layout area for driving a display panel. Alternatively, the disclosed technologies regarding the propose light-emitting-diode driver structure and its driving method, as provided in the following descriptions may also be applied to other circuit configurations. The present invention is not limited thereto.

In general, an objective in accordance with the present invention is to provide a novel light-emitting-diode driver structure and its operation method of the LED driver structure applicable to driving the display panel. By employing the proposed LED driver structure and its operation method thereof, it is believed that not only power consumption and circuit layout area of the conventional LED driver structure can be reduced, but also an enhanced data transmission efficiency of the LED driving circuit when employing the differential clock embedded interface for the multi-point LED driver structure can be achieved. As a result, an optimization result of both the power efficiency and circuit layout consumption can be accomplished when the disclosed technical solution of the present invention is adopted so as to drive a display panel in the fields.

Figure 2:
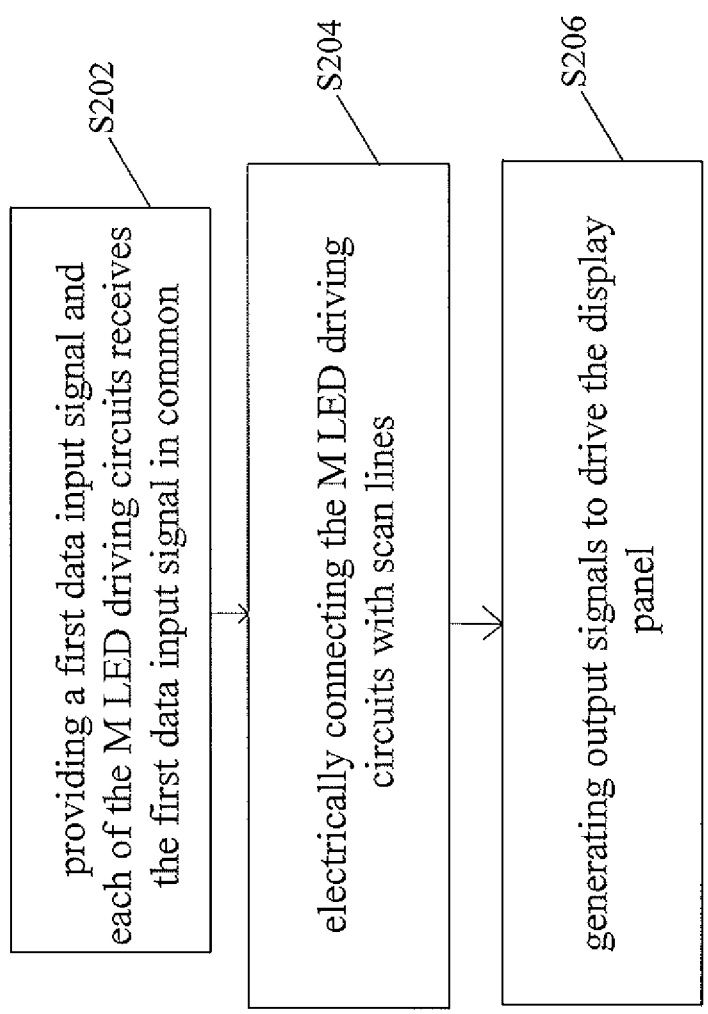
FIG. 2 shows a flow chart illustrating an operation method of the disclosed light-emitting-diode driver structure according to the first embodiment as shown in FIG. 1.

For detailed descriptions and understandings, please refer to FIG. 1, which schematically shows a system diagram illustrating a light-emitting-diode driver structure applicable to driving a display panel in accordance with a first embodiment of the present invention. FIG. 2 shows a flow chart illustrating an operation method of the disclosed light-emitting-diode driver structure according to the first embodiment as shown in FIG. 1. As referring to FIG. 1 in addition to FIG. 2, the present invention is aimed to provide a light-emitting-diode driver structure 100 and its operation thereof, and the light-emitting-diode driver structure 100 and its operation thereof used for driving a display panel will be introduced as in the following paragraphs.

According to the first embodiment of the present invention, the light-emitting-diode driver structure 100 includes a first light-emitting-diode (LED) driving group 10M. The first LED driving group 10M is electrically coupled with a plurality of scan lines S0, S1 . . . SN, and the first LED driving group 10M is composed of a plurality of M light-emitting-diode driving circuits, which are illustrated by the LED driving circuits L1A, L1B . . . L1M in the figure. As can be seen, the plurality of M light-emitting-diode driving circuits (L1A, L1B . . . L1M) are serially connected in cascade and M is a positive integer. In addition, according to the embodiment of the present invention, each of the plurality of M light-emitting-diode driving circuits (L1A, L1B . . . L1M) includes a signal data input terminal SDIN, and a data input signal DATA is provided to each signal data input terminal SDIN of the light-emitting-diode driving circuits (L1A, L1B . . . L1M) for each light-emitting-diode driving circuits (L1A, L1B . . . L1M) to receive. In order to distinguish that the data input signal DATA is received by the first LED driving group 10M, the data input signal DATA, hereinafter, will be introduced as a first data input signal.

By such configuration, when the first data input signal DATA is provided, and each of the M light-emitting-diode driving circuits (L1A, L1B . . . L1M) receives the first data input signal DATA in common, it is believed that the first LED driving group 10M of the invention is designed in a multidrop manner.

As referring to the flow chart described in FIG. 2 of the present invention at the same time, the disclosed operation method applicable to a light-emitting-diode driver structure for driving a display panel includes the disclosed steps of S202, S204 and S206. As described earlier in the previous sections, the LED driver structure 100 as proposed in the embodiment of FIG. 1 will be provided first, and the LED driver structure 100 includes the first LED driving group 10M, which is composed of the above-mentioned M light-emitting-diode driving circuits (L1A, L1B . . . L1M). The M light-emitting-diode driving circuits L1A, L1B . . . L1M are electrically connected in series and M belongs to a positive integer, for example, M=1, 2, 3, and so on.

As a result, while referring to the step of S202 in FIG. 2, then the first data input signal DATA can be provided and input to the first LED driving group 10M for each light-emitting-diode driving circuits L1A, L1B . . . L1M to receive through its signal data input terminal SDIN. And as such, each of the plurality of M light-emitting-diode driving circuits L1A, L1B . . . L1M is able to receive the first data input signal DATA in common such that the disclosed first LED driving group 10M performs as a multidrop driver circuit structure.

After that, as indicated in the step of S204 in FIG. 2, the operation method of the present invention proceeds to providing a plurality of scan lines and electrically connecting the plurality of M light-emitting-diode driving circuits L1A, L1B . . . L1M with the plurality of scan lines. And as illustrated in the embodiment in FIG. 1, since the plurality of M light-emitting-diode driving circuits L1A, L1B . . . L1M are jointly connected with the plurality of scan lines S0, S1 . . . SN and receive the first data input signal DATA in common, it is believed that upon receiving the first data input signal DATA, the plurality of M light-emitting-diode driving circuits L1A, L1B . . . L1M of the disclosed first LED driving group 10M are operable and adapted to generate a plurality of output signals OUTR, OUTG, OUTB, so as to drive a display panel (as illustrated in the step of S206 in the flow chart of FIG. 2).

In one embodiment, for instance, the generated output signal OUTR may be a red (R) output data transmission line, the generated output signal OUTG may be a green (G) output data transmission line, and the generated output signal OUTB may be a blue (B) output data transmission line. By adopting the plurality of output signals OUTR, OUTG, OUTB in accordance with control lines for controlling operation timings of an output and a polarity conversion operation of the disclosed driver structure, a display panel to be electrically coupled with the generated output signals OUTR, OUTG, OUTB can be effectively driven.

For instance, in one embodiment, a display device in which the present invention can be applied to drive and activate, may be a light board, or a part of a spliced screen of a display panel. The display panel can be, for example, a liquid crystal display (Liquid Crystal Display, LCD) panel, a light-emitting diode (Light-Emitting Diode, LED) display panel, or a micro-light-emitting diode (micro-LED) display panel, etc. And the data or clock signals transmitted between the driving circuits may include display data and/or control signals for controlling various parameters on the display panel, such as parameters related to image display, optical characteristics, audio characteristics, and so on. Alternatively, the data or clock signals may also be used to generate display data and/or control signals. However, in the display panel, since the signals are sequentially transmitted between the driving circuits stage by stage, that is to say, the driving circuit at the previous stage usually receives the data signal first, while the driving circuit at the rear stage often receives the data signal later, the driving circuits should be properly synchronized, so that the driving signal used in the driving circuit to control the display panel and the corresponding display device has synchronous output timing, indicating that the image can be displayed correctly. Since the related driving techniques have been known in the arts, the redundant descriptions are to be omitted and not discussed in the present invention by the Applicants.

Apparently, from the above-disclosed technical solution proposed by the present invention, a traditional transceiver circuit which was used in the prior arts for receiving and transmitting data signal can be successfully omitted. And therefore, a reduction in circuit layout area and power consumption of the prior design scheme can be well accomplished by employing the present invention. Moreover, an improved data transmission efficiency of the proposed light-emitting-diode driver structure when being employed for driving a display panel can be achieved since the proposed light-emitting-diode driver structure including its multiple LED driving groups is provided and designed in a multidrop manner as a multi-point LED driver structure.

And in addition, according to the embodiment of the present invention, apparently since there are a plurality of light-emitting-diode driving circuits L1A, L1B . . . L1M disposed in the LED driving group, in order to precisely determine which light-emitting-diode driving circuit is operable to receive the data input signal, a data enable input terminal and a data enable output terminal can be further disposed in the light-emitting-diode driving circuits L1A, L1B . . . L1M. As can be seen in FIG. 1 for the implementation, the data enable input terminal of each of the light-emitting-diode driving circuits L1A, L1B . . . L1M is indicated by "DE_IN", and the data enable output terminal of each of the light-emitting-diode driving circuits L1A, L1B . . . L1M is indicated by "DE_OUT". In order to obtain a bettering understanding and comprehension of the technical contents disclosed herein, please refer to FIG. 3 for a detailed configuration, in which each enable signal of its corresponding light-emitting-diode driving circuit will be shown in the explanatory embodiment.

Figure 3:
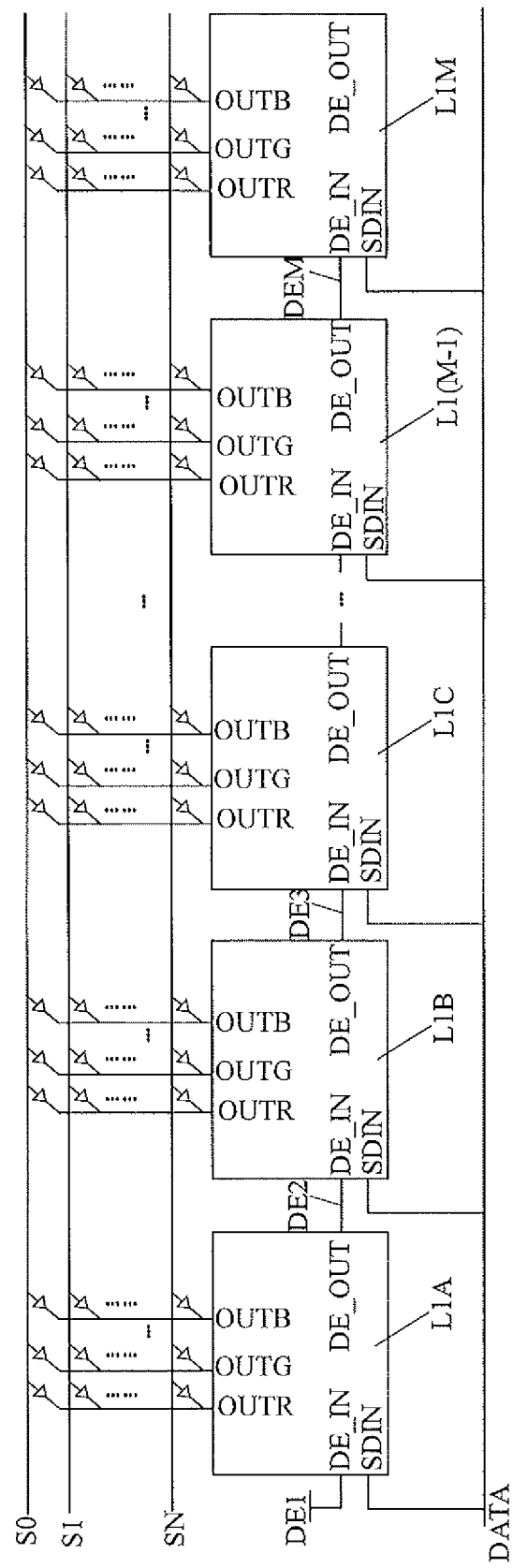
FIG. 3 schematically shows a detailed configuration, in which each enable signal of its corresponding light-emitting-diode driving circuit is illustrated in accordance with the embodiment of the present invention.

As can be seen from FIG. 3, the data enable input terminal DE_IN of the light-emitting-diode driving circuit L1A is adapted to receive a first enable signal DE1. The data enable input terminal DE_IN of the light-emitting-diode driving circuit L1B is adapted to receive a second enable signal DE2, and the second enable signal DE2 is an output signal of the data enable output terminal DE_OUT of the light-emitting-diode driving circuit L1A. In general, according to the embodiment of the present invention, a data enable input terminal DE_IN of one light-emitting-diode driving circuit is electrically connected to the data enable output terminal DE_OUT of another light-emitting-diode driving circuit which is connected in its previous stage.

And thus, by applying the similar cascaded manners, the output signal of the data enable output terminal DE_OUT of the light-emitting-diode driving circuit L1B is electrically connected to the data enable input terminal DE_IN of the light-emitting-diode driving circuit L1C such that the light-emitting-diode driving circuit L1C receives a third enable signal DE3 from the data enable output terminal DE_OUT of the light-emitting-diode driving circuit L1B.

And similarly, the data enable input terminal DE_IN of the light-emitting-diode driving circuit L1M is adapted to receive a Mth enable signal DEM from the data enable output terminal DE_OUT of its previous light-emitting-diode driving circuit L1(M-1).

Subsequently, please refer to FIG. 4, which schematically shows the corresponding waveforms including the clock signal SCLK, the first data input signal DATA, the first enable signal DE1 of the light-emitting-diode driving circuit L1A, the second enable signal DE2 of the light-emitting-diode driving circuit L1B, the third enable signal DE3 of the light-emitting-diode driving circuit L1C and the Mth enable signal DEM of the light-emitting-diode driving circuit L1M in accordance with the embodiment as shown in FIG. 3 of the present invention.

Figure 4:
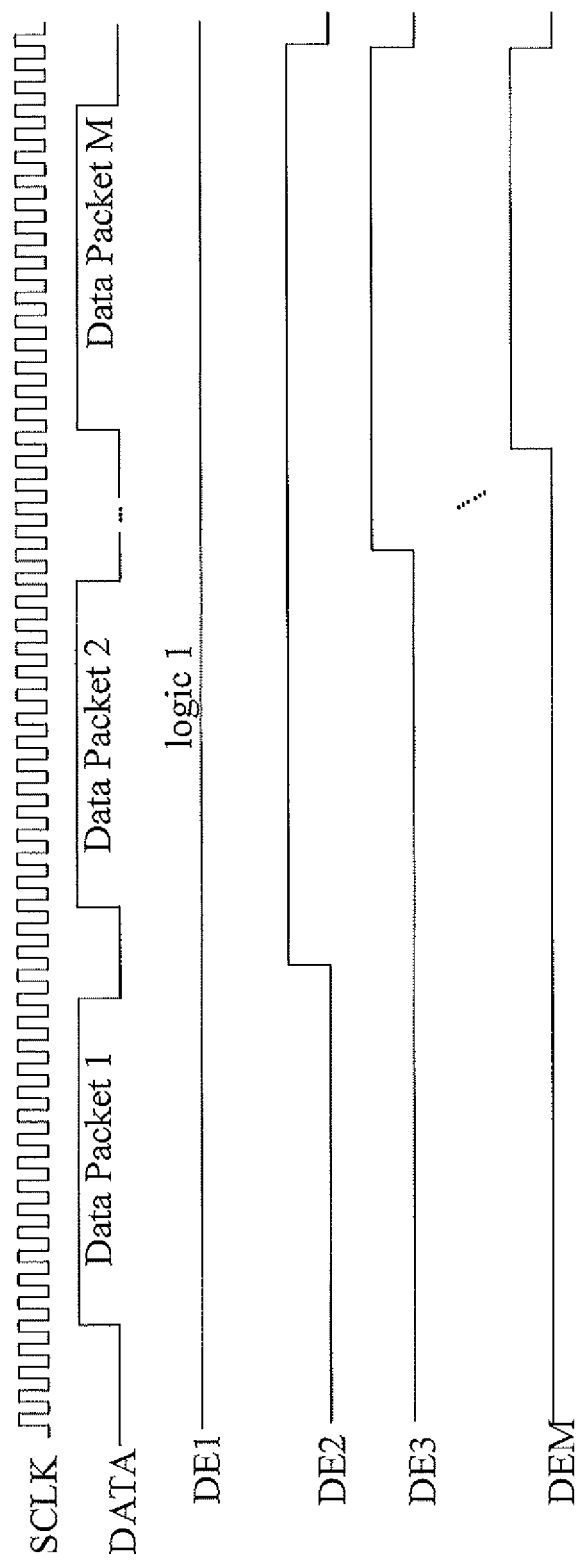
FIG. 4 schematically shows a plurality of corresponding waveforms including the clock signal, the first data input signal as well as a plurality of enable signals in accordance with the embodiment as shown in FIG. 3 of the present invention.

As can be seen from the corresponding waveforms illustrated in FIG. 4, it is determined that the first enable signal DE1 of the light-emitting-diode driving circuit L1A is controlled to be kept at a high voltage level, indicating that the light-emitting-diode driving circuit L1A is always turned on. After the light-emitting-diode driving circuit L1A receives its data input packet "Data Packet 1", the second enable signal DE2 of the light-emitting-diode driving circuit L1B will be turned on to a high voltage level such that the data packet can be successively transmitted to the light-emitting-diode driving circuit L1B for the light-emitting-diode driving circuit L1B to receive. And when the second enable signal DE2 of the light-emitting-diode driving circuit L1B is turned on to a high voltage level, the light-emitting-diode driving circuit L1B receives its data input packet "Data Packet 2". Similarly, after the light-emitting-diode driving circuit L1B receives its data input packet "Data Packet 2", the third enable signal DE3 of the light-emitting-diode driving circuit L1C will be turned on to a high voltage level such that the data packet can be successively transmitted to the light-emitting-diode driving circuit L1C for the following light-emitting-diode driving circuit L1C to receive. And when the third enable signal DE3 of the light-emitting-diode driving circuit L1C is turned on to a high voltage level, the light-emitting-diode driving circuit L1C receives its data input packet.

In other words, it is apparent that the present invention is proposed to provide a technical solution that, by proposing the data enable input terminal DE_IN which is adapted to receive an enable signal, when the enable signal is controlled to turn into logically high-level, it drives its corresponding light-emitting-diode driving circuit to be activated, such that the corresponding light-emitting-diode driving circuit is operable to receive a data packet from its data input signal. As a result, by employing the technical solution disclosed herein the present invention, the data packet can be successively transmitted in the first LED driving group for each of the M light-emitting-diode driving circuits L1A, L1B . . . L1M to receive, as the enable signal DE1, DE2, DE3 . . . and DEM of each of the M light-emitting-diode driving circuits L1A, L1B . . . L1M successively turns to be logically high-level.

To sum up, that is to say, it has been verified by the present invention, that by employing the disclosed operation method in which the data enable input terminal DE_IN and the data enable output terminal DE_OUT are further disposed in the light-emitting-diode driving circuit, the conventional FIFO (First in First Out) register which was used in the prior arts can be omitted, and thus the IC layout area of a known light-emitting-diode driving circuit is believed to be significantly reduced. In addition, regarding the plurality of serially connected light-emitting-diode driving circuits in cascade, since the rear light-emitting-diode driving circuit is only turned on and receives the data input packet after its previous light-emitting-diode driving circuit finishes receiving the data input, such operation method disclosed by the present invention is also advantageous of saving great power consumption for the entire light-emitting-diode driver system of the display panel. As a result, it is assured that when applying the multi-point (also known as a multi-drop) light-emitting-diode driving circuit in the driver structure scheme of the display panel, the present invention significantly achieves in both power consumption and circuit layout area reduction efficacy.

Figure 5:
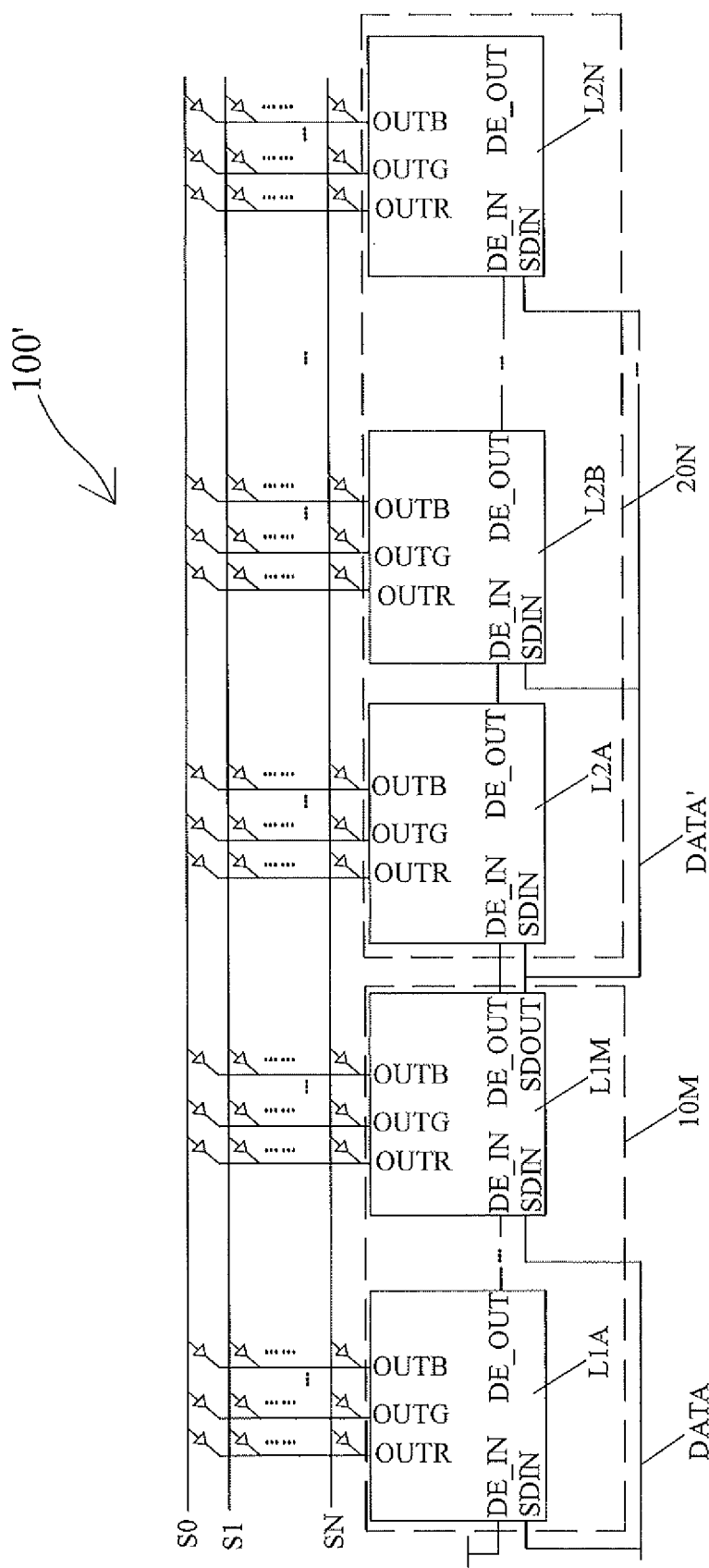
FIG. 5 schematically shows a system diagram illustrating a light-emitting-diode driver structure applicable to driving a display panel in accordance with a second embodiment of the present invention when a second LED driving group is further serially connected to the first LED driving group and the data input signal of the second LED driving group is provided by an output terminal of the first LED driving group.
Figure 6:
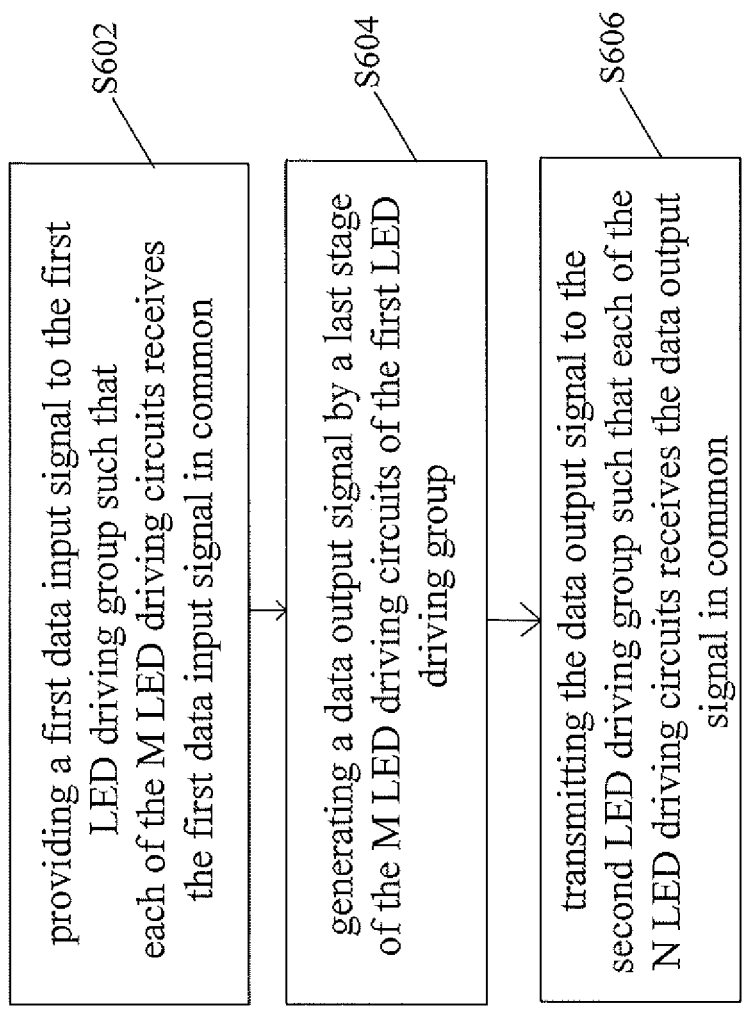
FIG. 6 shows a flow chart illustrating an operation method of the disclosed light-emitting-diode driver structure according to the second embodiment as shown in FIG. 5.

And furthermore, in the following paragraphs, please proceed to refer to FIG. 5 for another modified embodiment of the present invention. According to the invention, FIG. 5 schematically shows a system diagram illustrating a light-emitting-diode driver structure applicable to driving a display panel in accordance with a second embodiment of the present invention. FIG. 6 shows a flow chart illustrating an operation method of the disclosed light-emitting-diode driver structure according to the second embodiment as shown in FIG. 5. As referring to FIG. 5 in addition to FIG. 6, it can be seen that the modified embodiment disclosed herein is aimed to provide a light-emitting-diode driver structure 100' and its operation thereof, and the light-emitting-diode driver structure 100' and its operation thereof used for driving a display panel will be introduced as in the following paragraphs.

According to the second embodiment of the present invention, in addition to the previously provided first LED driving group 10M, the light-emitting-diode driver structure 100' may further include a second LED driving group 20N. And the second LED driving group 20N is electrically coupled with the plurality of scan lines S0, S1 . . . SN so as to generate the plurality of output signals OUTR, OUTG, OUTB in order to drive the display panel. The second LED driving group 20N is composed of a plurality of N light-emitting-diode driving circuits, which are illustrated by the LED driving circuits L2A, L2B . . . L2N in the figure. As can be seen, the plurality of N light-emitting-diode driving circuits (L2A, L2B . . . L2N) are serially connected in cascade and N is a positive integer, for instance, N=1, 2, 3 . . . and so on. According to the embodiment of the present invention, it is also configured that each of the plurality of N light-emitting-diode driving circuits (L2A, L2B . . . L2N) includes a signal data input terminal SDIN, and a data input signal DATA' is provided to each signal data input terminal SDIN of the light-emitting-diode driving circuits (L2A, L2B . . . L2N) for each light-emitting-diode driving circuits (L2A, L2B . . . L2N) to receive. In order to distinguish that the data input signal DATA' is a variant input signal, different from the previously described data input signal DATA, and the data input signal DATA' is received by the second LED driving group 20N, the data input signal DATA', hereinafter, will be introduced as a second data input signal.

By such configuration, when the second data input signal DATA' is provided, and each of the N light-emitting-diode driving circuits (L2A, L2B . . . L2N) receives the second data input signal DATA' in common, it is believed that the second LED driving group 20N of the light-emitting-diode driver structure 100' is also designed in a multidrop manner. Moreover, it is noted that according to the embodiment, the second LED driving group 20N which includes the plurality of N light-emitting-diode LED driving circuits (L2A, L2B . . . L2N) is operable and configured to receive a data output signal of a last stage of the M LED driving circuits (L1A, L1B . . . L1M) of the first LED driving group 10M in common.

Furthermore, as referring to the flow chart proposed in FIG. 6 of the present invention at the same time, the disclosed operation method applicable to the light-emitting-diode driver structure disclosed in FIG. 5, for driving the display panel is introduced as follows and includes the steps of S602, S604 and S606. As described earlier in the embodiment in FIG. 5, in addition to the foregoing first LED driving group 10M, the second LED driving group 20N which includes the plurality of N light-emitting-diode driving circuits (L2A, L2B . . . L2N) can be further provided, wherein the N light-emitting-diode driving circuits L2A, L2B . . . L2N are serially connected in cascade and N belongs to a positive integer, for example, N=1, 2, 3, . . . etc.

As a result, by such configuration, as indicated in the step of S602 in FIG. 6, the first data input signal DATA is provided first to the first LED driving group 10M, such that each of the plurality of M LED driving circuits (L1A, L1B . . . L1M) receives the first data input signal DATA in common.

Later, as referring to the step of S604, upon receiving the first data input signal DATA in common, the last stage of the plurality of M LED driving circuits (L1A, L1B . . . L1M) of the first LED driving group 10M is operable and configured to generate a data output signal. Under such conditions, it should be acknowledged that it is the last-stage LED driving circuit L1M of the first LED driving group 10M generates the data output signal. And, the data output signal is known as the second data input signal DATA', as it has been discussed in the earlier paragraphs in the Application.

And therefore, as indicated in the step of S606 in FIG. 6, the data output signal, which is the second data input signal DATA', will be transmitted to the second LED driving group 20N for the second LED driving group 20N to receive. As a result, by such configurations, it is believed that each of the N LED driving circuits (L2A, L2B ... L2N) of the second LED driving group 20N receives the data output signal of the last stage of the M LED driving circuits of the first LED driving group 10M in common.

By employing such technical solution provided in FIG. 5 and FIG. 6, then it is believed that the modified light-emitting-diode driver structure 100' includes both the first LED driving group 10M and the second LED driving group 20N and is able to use the first LED driving group 10M and the second LED driving group 20N which are electrically connected in series for data packet transmission so as to drive a corresponding display panel.

Figure 7:
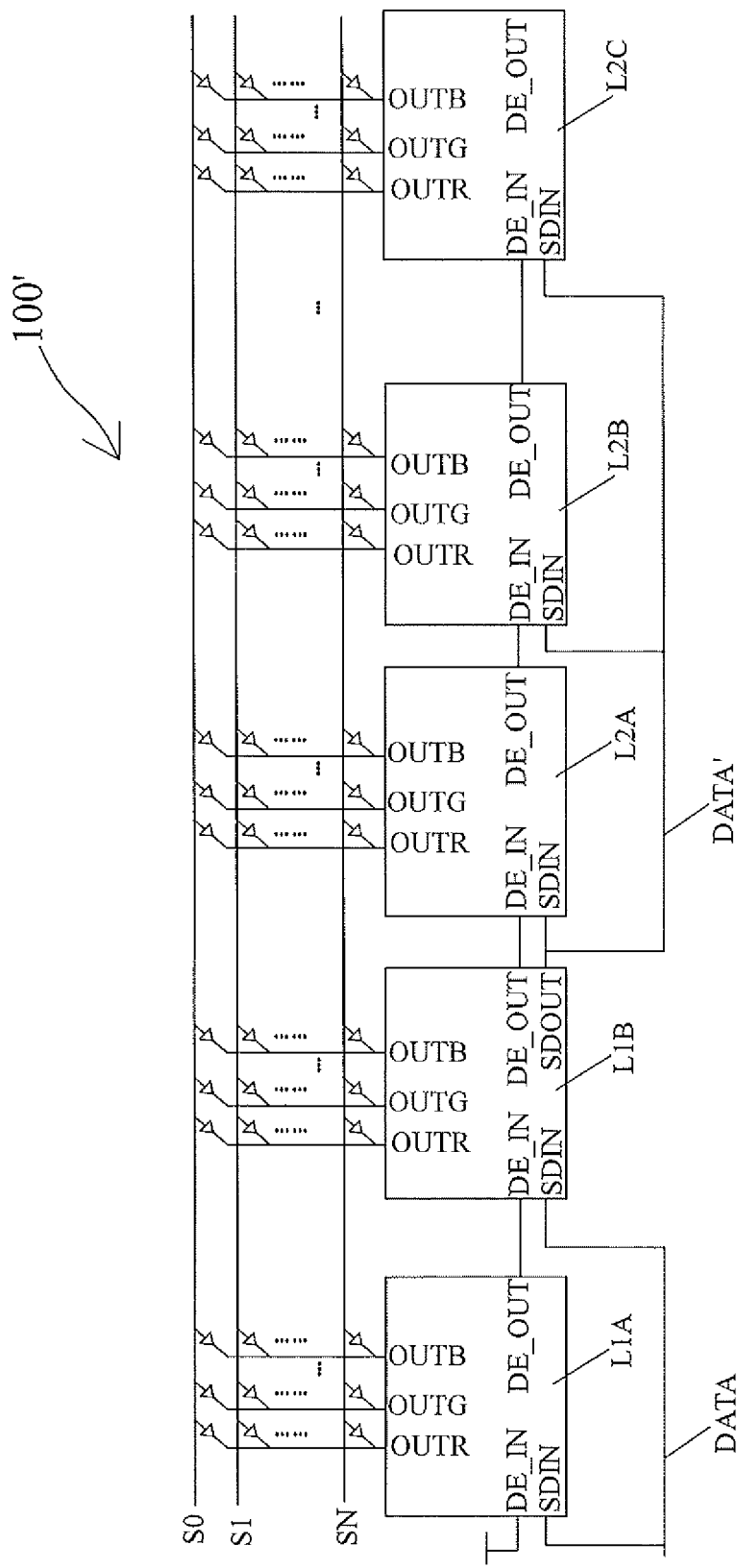
FIG. 7 shows a demonstrative embodiment according to FIG. 5 in which when M=2 and N=3.

As can be seen in the embodiment of FIG. 5, it is observed that the second data input signal DATA' for each light-emitting-diode driving circuits L2A, L2B ... L2N of the second LED driving group 20N to receive in common, is generated and provided by a signal data output terminal SDOUT of the light-emitting-diode driving circuit L1M in the first LED driving group 10M. By adopting such configurations, FIG. 7 shows a demonstrative embodiment according to FIG. 5 when M=2 and N=3. In this case, the first LED driving group 10M includes the light-emitting-diode driving circuits L1A and L1B. The second LED driving group 20N includes the light-emitting-diode driving circuits L2A and L2B and L2C. The data input transmitted to the second LED driving group is the data output of the light-emitting-diode driving circuit connected ahead in its previous stage in the first LED driving group. As a result, according to the modified embodiment of the present invention, it is apparent that the multi-drop LED driving circuit scheme may also be partially applied, and the invention affirmatively covers the modification with equality.

As such, it should be noted that according to the foregoing disclosed technical contents provided by the Applicant, the present invention is certainly not limited thereto by the above-mentioned embodiments. In other words, the above-disclosed multi-point LED driver scheme can alternatively be partially applied to the plurality of light-emitting-diode driving circuits in a display panel. And the multi-point driver scheme may also comprise other types of driving circuits, which should not be limited to the display system described in this disclosure. According to the application of the multi-point driver structure, each driving circuit may be implemented by adopting an integrated circuit fabricated on a chip, such that signal synchronization can be performed between various IC chips.

In general, for people who are skilled in the art and having ordinary understandings and technical backgrounds to the present invention, it would be allowed for the skilled in the arts to make various modifications or changes depending on different circuit regulations and/or specifications without departing from the scope of the invention. That is to say, the present invention is certainly not limited thereto. And the variant embodiments and/or circuit implementations should still fall into the claim scope of the present invention.

In view of the above disclosed embodiments, it can be seen that since there will be no transmitting circuit (TX) needed to be disposed for transmitting each data input to each light-emitting-diode driving circuit in the invention, a circuit layout configuration for a convention TX circuit can be reduced. And as a result, it is also believed that a total power consumption may also be significantly suppressed by employing the present invention.

Figure 8:
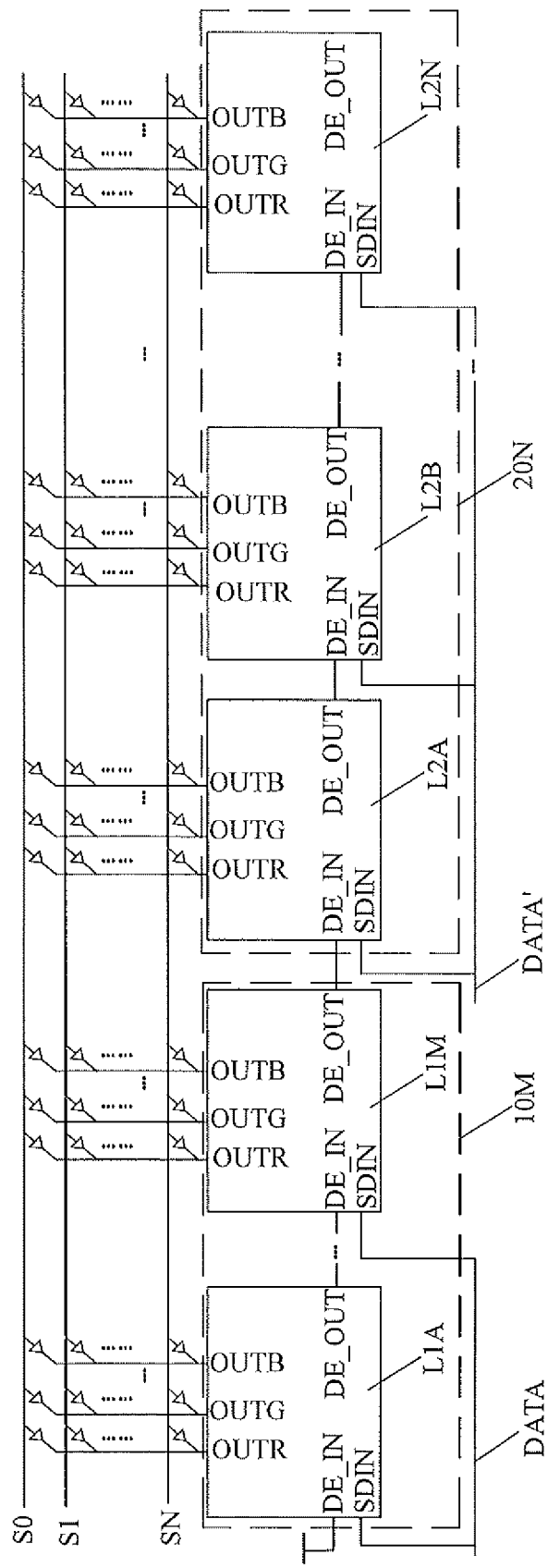
FIG. 8 schematically shows a system diagram illustrating a light-emitting-diode driver structure applicable to driving a display panel in accordance with a third embodiment of the present invention when the data input signal of the second LED driving group is an independent data input signal.

In addition, please refer FIG. 8, which schematically shows a system diagram illustrating a light-emitting-diode driver structure applicable to driving a display panel in accordance with a third embodiment of the present invention. Compared with the previously described embodiments as shown in FIG. 5 and FIG. 7, FIG. 8, hereinafter, is disclosed so as to provide another feasible embodiment of the present invention. As can be seen in the embodiments of FIG. 5 and FIG. 7, the second data input signal DATA' of the second LED driving group 20N is illustrated by being generated and provided by the signal data output terminal SDOUT of its foregoing first LED driving group 10M. That is to say, each of the plurality of N LED driving circuits L2A, L2B ... L2N receives the data output signal of the last stage of the LED driving circuits of the first LED driving group 10M (which is the LED driving circuit L1M) in common. However, the present invention is not limited thereto. According to another applicable embodiment as disclosed in FIG. 8, it is apparent that the second data input signal DATA' for the second LED driving group 20N to receive may alternatively be an independent data input signal. And yet, the present invention covers the modified implementation as well. That is to say, the multi-point LED driver scheme of the present invention can be widely applied to a plurality of LED driving circuits in a display panel, and the multi-point LED driver scheme can be fully or partially adopted, based on the actual circuit regulation as required by people skilled in the arts. The plurality of modified embodiments are still able to be employed so as to attain the inventive effects of the present invention, and fall into the claim scope of the present invention.

To sum above, it is apparent that the multi-point LED driver scheme can alternatively be partially applied to the plurality of light-emitting-diode driving circuits in a display panel, and yet still attain the inventive effects of the present invention. The multi-point (multi-drop) LED driver scheme can be partially applied, and the invention covers the modification with equality.

By adopting the similar methodologies as described in the first embodiment of the invention, regarding the data transmission process occurring in the second LED driving group 20N, then each of the light-emitting-diode driving circuits L2A, L2B, L2C ... L2N in the second LED driving group 20N may also be configured to include a data enable input terminal DE_IN and a data enable output terminal DE_OUT to receive and transmit the enable signal for successively turning on the light-emitting-diode driving circuits L2A, L2B, L2C ... L2N in order, such that the data packet can be successively transmitted by each light-emitting-diode driving circuits L2A, L2B ... L2N in the second LED driving group 20N. The detailed descriptions are the same as they have been disclosed in the earlier paragraphs of the invention. And thus, the Applicants spare the same descriptions.

To sum up, the present invention provides a multi-point LED driver structure and an operation method thereof to drive a display panel, wherein a plurality of serially connected LED driving groups can be connected in cascade to drive or control the display panel to achieve a predetermined function, such as controlling a display panel to display images. Since the plurality of driving circuits are serially connected to each other, each driving circuit is adapted to receive a data input or clock signal from the previous stage and transfer the data input or clock signal to the next stage. The driving signals output by these driving circuits should be well synchronized to eliminate the time difference between the output driving signals. For instance, in one applicable embodiment, a replication circuit or frame scheme may be used for synchronization. And each driving circuit can be an integrated circuit implemented on a chip, so that the synchronization mechanism can be applied to the disclosed multi-drop driver structure of the present invention, so as to effectively realize synchronization between various IC chips.

Furthermore, in another aspect, regarding the multi-drop bus interface for the disclosed multi-point light-emitting-diode driving circuits in the present invention, since there are several known non ideal factors which may affect the transmission speed and quality of its transmitting data signal, a few explanatory variables should still be taken into considerations, for instance, influences from the signal reflection, cross-talks, signal loss, impedance mismatching, inter-symbol interference (ISI), loads from resistive and/or capacitive components, and so on. As a result, according to the technical contents of the present invention, it is required that the run length of the clock embedded data (the first data input signal and the second data input signal as illustrated by "DATA" and "DATA'" in the invention) should be less than 20. In general, a run length is defined as the consecutive identical digits (CIDs) of "1" or "0" which occurs in the transmitting channel. For example, when the run length is five, it means the number of the consecutive identical digits of "1" or "0" that may appear in the transmitting channel including: 1, 2, 3, 4, 5. As known, for transmitting channels which are possibly formed by more combinations of signal waveforms, the non-ideal effects as described earlier will accumulate, such that quality of the transmitting signal will be significantly degraded. As a result, the present invention may also claim a run length of its data signal (clock embedded data) should be no more than twenty.

On account of the above, it is obvious that the present invention, while compared to the prior arts, is apparently effective in reducing redundant power waste and avoiding additional circuit layout area of the conventional TX circuit of the light-emitting-diode (LED) driving circuit of a display panel. Since the conventional power waste is reduced, a total IC power consumption of the display panel and its display device to be applied, can be decreased as well, indicating that, redundant power waste is avoided. It is thus, believed that the disclosed multi-point light-emitting-diode driver structure and operation method thereof are effective in solving the severe power-consuming problems existing in the prior arts.

And as such, it is believed that by employing the proposed light-emitting-diode driver structure and its operation method thereof the invention to drive a display panel, the power consumption compared to the prior arts is thus, greatly much reduced. Apart from these, the additional circuit layout area for a conventional transceiver for receiving and transmitting data signals can be omitted. Thereby, it is believed that the present invention achieves to successfully solves the problems of the conventional prior arts and performs as being highly competitive and able to be widely utilized in any related industries.

In addition, an improved data transmission efficiency and signal quality of the light-emitting-diode driving circuit when employing the differential clock embedded interface for the multi-point LED driver scheme can also be well accomplished by employing the disclosed operation method of the present invention. And as such, based on at least one embodiment provided above, it is believed that the proposed light-emitting-diode driver structure and its operation method are believed as being beneficial to reducing IC power consumption. As a result, when compared to the prior arts, it is obvious that the present invention apparently shows much more effective performances than before.

To sum up, it has been proved and verified that the present invention is sophisticatedly designed, and the whole new driving techniques can be employed along with a multi-point LED driving circuit architecture and has succeeded in minimizing its IC power consumption. Meanwhile, the deficiencies which have been existing in the prior arts are effectively avoided by adopting the present invention. As a result, it is evident and believed that the present invention is instinct, effective and highly competitive for IC technology and industries in the market nowadays, whereby having extraordinary availability and competitiveness for future industrial developments and being in condition for early allowance.

These and other objectives of the present invention will become obvious to those of ordinary skill in the art after reading the following detailed description of preferred embodiments. And it is to be understood that both the foregoing general description and the following detailed description are exemplary and are intended to provide further explanation of the invention as claimed.

It will be apparent to those skilled in the art that various modifications and variations can be made to the present invention without departing from the scope or spirit of the invention. Alternative preferable components are compatible. And the variant embodiments and/or circuit implementations should still fall into the claim scope of the present invention. As a result, in view of the foregoing, it is intended that the present invention cover modifications and variations of this invention provided they fall within the scope of the invention and its equivalent.

What is claimed is:

1. A light-emitting-diode (LED) driver structure applicable to driving a display panel, comprising:
  a first light-emitting-diode (LED) driving group, which includes a plurality of M light-emitting-diode (LED) driving circuits which are connected in series defining a plurality of first driving circuit stages, and configured to receive a first data input signal on a first common data line connected to respective data input terminals of each of said M light-emitting-diode (LED) driving circuits, wherein M is a positive integer; and
  a second light-emitting-diode (LED) driving group, which includes a plurality of N light-emitting-diode (LED) driving circuits which are connected in series defining a plurality of second driving circuit stages, and configured to receive a second data input signal which is a data output signal of a last stage of the plurality of M light-emitting-diode (LED) driving circuits of the first light-emitting-diode (LED) driving group on a second common data line connected to respective data input terminals of each of said N light-emitting-diode (LED) driving circuits, wherein N is a positive integer, and said first data input signal and said second data input signal, which is the data output signal of said last stage of said first light-emitting-diode (LED) driving group, represent RGB display data for driving the display panel;

wherein each of said plurality of M and N LED driving circuits providing a plurality of output signals resulting from said RGB display data and consisting of a first output signal on a red output data transmission line, a second output signal on a green output data transmission line, and a third output signal on a blue data transmission line.

2. The light-emitting-diode (LED) driver structure according to claim 1, wherein each of the plurality of M light-emitting-diode (LED) driving circuits further comprises a data enable input terminal and a data enable output terminal, the data enable input terminal is adapted to receive an enable signal, and when the enable signal turns to be logically high-level, one of the plurality of M light-emitting-diode (LED) driving circuits is activated to receive a data packet from the first data input signal.

3. The light-emitting-diode (LED) driver structure according to claim 2, wherein the data packet is successively transmitted in the first light-emitting-diode (LED) driving group for each of the plurality of M light-emitting-diode (LED) driving circuits to receive, as the enable signal of each of the plurality of M light-emitting-diode (LED) driving circuits successively turns to be logically high-level.

4. The light-emitting-diode (LED) driver structure according to claim 2, wherein the data enable input terminal of one of the plurality of M light-emitting-diode (LED) driving circuits is electrically connected to the data enable output terminal of another of the plurality of M light-emitting-diode (LED) driving circuits connected in its previous stage.

5. The light-emitting-diode (LED) driver structure according to claim 1, wherein each of the plurality of N light-emitting-diode (LED) driving circuits further comprises a data enable input terminal and a data enable output terminal, the data enable input terminal is adapted to receive an enable signal, and when the enable signal turns to be logically high-level, one of the plurality of N light-emitting-diode (LED) driving circuits is activated to receive a data packet from the data output signal of the last stage of the plurality of M light-emitting-diode (LED) driving circuits of the first light-emitting-diode (LED) driving group.

6. The light-emitting-diode (LED) driver structure according to claim 5, wherein the data packet is successively transmitted in the second light-emitting-diode (LED) driving group for each of the plurality of N light-emitting-diode (LED) driving circuits to receive, as the enable signal of each of the plurality of N light-emitting-diode (LED) driving circuits successively turns to be logically high-level.

7. The light-emitting-diode (LED) driver structure according to claim 5, wherein the data enable input terminal of one of the plurality of N light-emitting-diode (LED) driving circuits is electrically connected to the data enable output terminal of another of the plurality of N light-emitting-diode (LED) driving circuits connected in its previous stage.

8. The light-emitting-diode (LED) driver structure according to claim 1, wherein a run length of the first data input signal is less than twenty.

9. An operation method applicable to a light-emitting-diode (LED) driver structure for driving a display panel, wherein the light-emitting-diode driver structure comprises a first light-emitting-diode (LED) driving group and a second light-emitting-diode (LED) driving group, the first light-emitting-diode (LED) driving group includes a plurality of M light-emitting-diode (LED) driving circuits which are connected in series and define a plurality of first driving circuit stages, and M is a positive integer, and the second light-emitting-diode (LED) driving group includes a plurality of N light-emitting-diode (LED) driving circuits which are connected in series and define a plurality of second driving circuit stages, and N is a positive integer, the operation method comprising:

providing a first data input signal to the first light-emitting-diode (LED) driving group such that each of the plurality of M light-emitting-diode (LED) driving circuits receives the first data input signal on a first common data line connected to respective data input terminals of each of said M light-emitting-diode (LED) driving circuits;

upon receiving the first data input signal from the first common data line, generating a data output signal from a last stage of the plurality of M light-emitting-diode (LED) driving circuits of the first light-emitting-diode (LED) driving group; and transmitting the data output signal to the second light-emitting-diode (LED) driving group such that each of the plurality of N light-emitting-diode (LED) driving circuits receives the data output signal of the last stage of the plurality of M light-emitting-diode (LED) driving circuits of the first light-emitting-diode (LED) driving group as a second data input signal on a second common data line connected to respective data input terminals of each of said N light-emitting-diode (LED) driving circuits, and said first data input signal and said second data input signal, which is the data output signal of said last stage of said first light-emitting-diode (LED) driving group, represent RGB display data for driving the display panel:

wherein each of said plurality of M and N LED driving circuits providing a plurality of output signals resulting from said RGB display data and consisting of a first output signal on a red output data transmission line, a second output signal on a green output data transmission line, and a third output signal on a blue data transmission line.

10. The operation method applicable to the light-emitting-diode driver structure for driving the display panel according to claim 9, wherein each of the plurality of M light-emitting-diode (LED) driving circuits further comprises a data enable input terminal and a data enable output terminal, the data enable input terminal is adapted to receive an enable signal, and when the enable signal turns to be logically high-level, one of the plurality of M light-emitting-diode (LED) driving circuits is activated to receive a data packet from the first data input signal.

11. The operation method applicable to the light-emitting-diode driver structure for driving the display panel according to claim 10, wherein the data packet is successively transmitted in the first light-emitting-diode (LED) driving group for each of the plurality of M light-emitting-diode (LED) driving circuits to receive, as the enable signal of each of the plurality of M light-emitting-diode (LED) driving circuits successively turns to be logically high-level.

12. The operation method applicable to the light-emitting-diode driver structure for driving the display panel according to claim 10, wherein the data enable input terminal of one of the plurality of M light-emitting-diode (LED) driving circuits is electrically connected to the data enable output terminal of another of the plurality of M light-emitting-diode (LED) driving circuits connected in its previous stage.

13. The operation method applicable to the light-emitting-diode driver structure for driving the display panel according to claim 9, wherein each of the plurality of N light-emitting-diode (LED) driving circuits further comprises a data enable input terminal and a data enable output terminal, the data enable input terminal is adapted to receive an enable signal, and when the enable signal turns to be logically high-level, one of the plurality of N light-emitting-diode (LED) driving circuits is activated to receive a data packet from the data output signal of the last stage of the plurality of M light-emitting-diode (LED) driving circuits of the first light-emitting-diode (LED) driving group.

14. The operation method applicable to the light-emitting-diode driver structure for driving the display panel according to claim 13, wherein the data packet is successively transmitted in the second light-emitting-diode (LED) driving group for each of the plurality of N light-emitting-diode (LED) driving circuits to receive, as the enable signal of each of the plurality of N light-emitting-diode (LED) driving circuits successively turns to be logically high-level.

15. The operation method applicable to the light-emitting-diode driver structure for driving the display panel according to claim 13, wherein the data enable input terminal of one of the plurality of N light-emitting-diode (LED) driving circuits is electrically connected to the data enable output terminal of another of the plurality of N light-emitting-diode (LED) driving circuits connected in its previous stage.

16. The operation method applicable to the light-emitting-diode driver structure for driving the display panel according to claim 9, wherein a run length of the first data input signal is less than twenty.

* * * * *